United States Patent [19]

Bergene et al.

[11] Patent Number: 4,979,092
[45] Date of Patent: Dec. 18, 1990

[54] HITCH CONTROL SYSTEM

[75] Inventors: Mark A. Bergene; Thomas E. Boe, both of Cedar Falls, Iowa

[73] Assignee: Deere & Company, Moline, Ill.

[21] Appl. No.: 294,522

[22] Filed: Jan. 6, 1989

[51] Int. Cl.$^5$ ................. G05B 13/04; A01B 63/112
[52] U.S. Cl. ......................... 364/148; 364/153; 364/424.07; 172/3; 172/10
[58] Field of Search .................. 172/2, 3, 7, 9, 10; 364/148, 153, 180, 424.07, 157

[56] References Cited

U.S. PATENT DOCUMENTS

| | | | |
|---|---|---|---|
| 2,921,638 | 1/1960 | Du Shane | 172/9 |
| 3,455,397 | 7/1969 | Nelson et al. | 172/9 |
| 3,757,868 | 9/1973 | Gregerson | 172/9 |
| 4,064,945 | 12/1977 | Haney | 172/10 |
| 4,108,248 | 8/1978 | Mueller, Jr. | 172/7 |
| 4,300,638 | 11/1981 | Katayama et al. | 172/10 |
| 4,385,353 | 5/1983 | Schneider | 364/424 |
| 4,495,577 | 1/1985 | Strunk et al. | 364/1424 |
| 4,503,916 | 3/1985 | Wiegardt | 172/3 |
| 4,508,176 | 4/1985 | Wiegardt et al. | 172/7 |
| 4,518,044 | 5/1985 | Wiegardt et al. | 172/7 |
| 4,571,500 | 2/1986 | Mucheyer | 172/10 |
| 4,677,542 | 6/1987 | Kasten | 364/150 |
| 4,796,712 | 1/1989 | Rutkowski et al. | 172/7 |
| 4,807,136 | 2/1989 | Rutkowski et al. | 172/7 |
| 4,809,785 | 3/1989 | Arnold et al. | 172/9 |
| 4,817,499 | 4/1989 | Bellanger et al. | 91/361 |
| 4,846,283 | 7/1989 | Batcheller | 172/10 |
| 4,852,657 | 8/1989 | Hardy et al. | 172/2 |

FOREIGN PATENT DOCUMENTS 1503592 3/1978 United Kingdom .

OTHER PUBLICATIONS

Deere & Co., "Rockshaft and Implement Hitch", 1980, TM-1199, pp. 270-25-1 through 270-25-12.
R. E. Squires, "Electronic Draft Control System", date unknown, pp. 67-75.
Revere Corp., "Model GZ-10 Goyinta Sensor", 1986, 4 pages.

Primary Examiner—Jerry Smith
Assistant Examiner—Paul Gordon

[57] ABSTRACT

A hitch control system includes a draft force sensor, a hitch position sensor, an operator command lever, an upper hitch position limit setter, a mixer setter, a drop rate setter and a control unit which generates control signals as a function thereof. The control system includes a first (load) control mode wherein the hitch is controlled as a linear function primarily of sensed draft force and a second control mode wherein the hitch is controlled purely as a non-linear function of sensed hitch position. In the load control mode, a reference position value is used as a set point representing only the lower range of positions of the hitch. Draft force sensitivity and system gain values are derived from the mix setter so that increasing the sensitivity also increases the system gain. The sensitivity value is limited within a predetermined range.

14 Claims, 16 Drawing Sheets

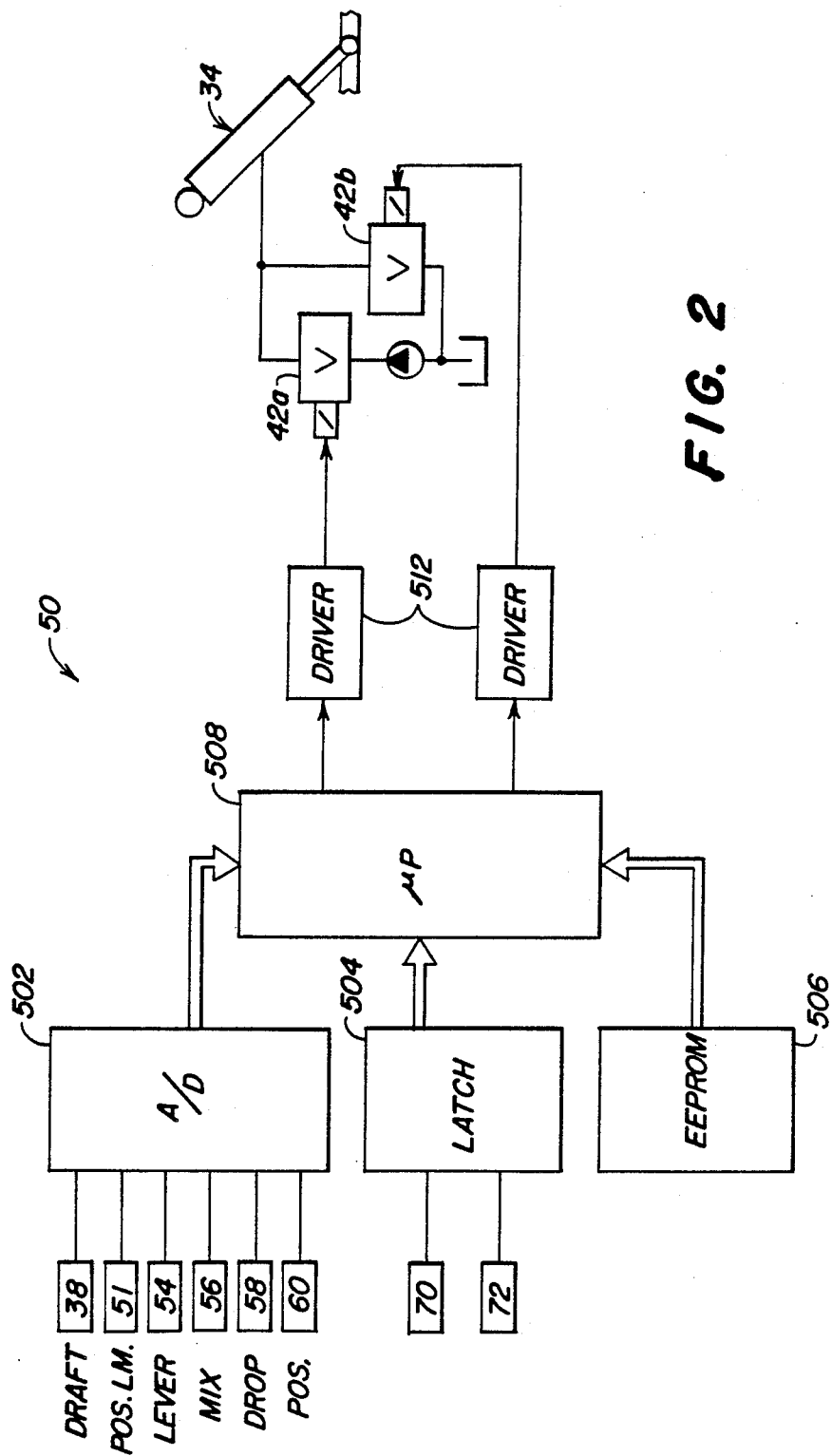

HITCH CONTROL SYSTEM

BACKGROUND OF THE INVENTION

This application includes a microfiche appendix including 2 microfiche and 140 frames.

A portion of the disclosure of this patent document contains material which is subject to a claim of copyright protection. The copyright owner has no objection to the facsimile reproduction by anyone of the patent document or the patent disclosure as it appears in the Patent and Trademark Office patent file or records, but otherwise reserves all other rights whatsoever.

This invention relates to a control system for controlling the working depth of a tractor-coupled implement as a function of various sensed and operator-controlled parameters.

Various hitch control systems have been designed and built or proposed. Conventional production hydromechanical hitch control systems, such as described in U.S. Pat. No. 3,757,868, have relatively simple controls with which operators have become familiar over a period of years - a console or command lever and a "mix" control. However, by their very nature, the function of such systems has been and is limited in certain respects. For example, if such a system is operating in a draft force responsive mode in a steady state, equilibrium condition, changes in the "load/depth" or "mix" setting will cause significant changes in implement operating depth. If the operator desires to continue operating at the original depth, the operator must make an additional adjustment of the command lever. Also, such a system must vigorously respond to changes in sensed draft force in order to raise and lower an implement through the resistance of the earth in which it operates. This requires a control system with a relatively high gain. However, when such a control system is operated to raise or lower a hitch when the implement is above the ground, this high gain or sensitivity may cause rapid and abrupt hitch movement with resultant undesirable vibration and stress on the linkages and hydraulic components. Furthermore, with the conventional hydromechanical system, when the "mix" control is adjusted to increase the sensitivity of the control system to changes in sensed draft force, the overall gain of the system will be decreased. Also, "mix" control can be moved to adjust this sensitivity beyond a range which is actually useful during field operation.

Various attempts have been made to improve hitch control system performance utilizing electronics and/or microprocessors. See, for example, U.S. Pat. Nos. 4,508,176; 4,518,044 and 4,503,916. However, such systems utilizing electronics have not generally been fully utilized due to factors such as complexity of the operator controls. It would be desirable to provide a hitch control system which has operator controls which are similar to those utilized in the conventional hydromechanical systems, but which has performance advantages made possible by electronics.

SUMMARY OF THE INVENTION

An object of the present invention is to provide a hitch control system with simple operator controls and improved performance utilizing a microprocessor.

Another object of the present invention is to provide a hitch control system wherein changes in a load/depth mix setter will have a minimal effect on operating depth during normal, steady draft control operation.

Another object of the present invention is to provide a hitch control system which smoothly controls the hitch when the implement is out of the ground and which vigorously controls the implement when it is operating in the ground.

These and other objects are achieved by the present invention wherein a hitch control system includes a draft force sensor, a hitch position sensor, an operator command lever, an upper hitch position limit setter, a mix setter, a drop rate setter and a control unit which generates control signals as a function thereof. The control system includes a first (load) control mode wherein the hitch is controlled as a linear function of a mixture of sensed draft force and position and a second control mode wherein the hitch is controlled purely as a non-linear function of sensed hitch position. In the load control mode, a reference position value is used as a set point representing only the lower range of hitch positions. Draft force/position relative sensitivity and system gain values are derived from the mix setter so that increasing the sensitivity also increases the system gain. The sensitivity value is limited so that the relative influence of sensed draft force versus sensed position varies only from approximately 0.5 to 2.0.

BRIEF DESCRIPTION OF THE DRAWINGS

FIG. 2 is an electrical and hydraulic schematic diagram of the present invention.

DETAILED DESCRIPTION

Figure 1:
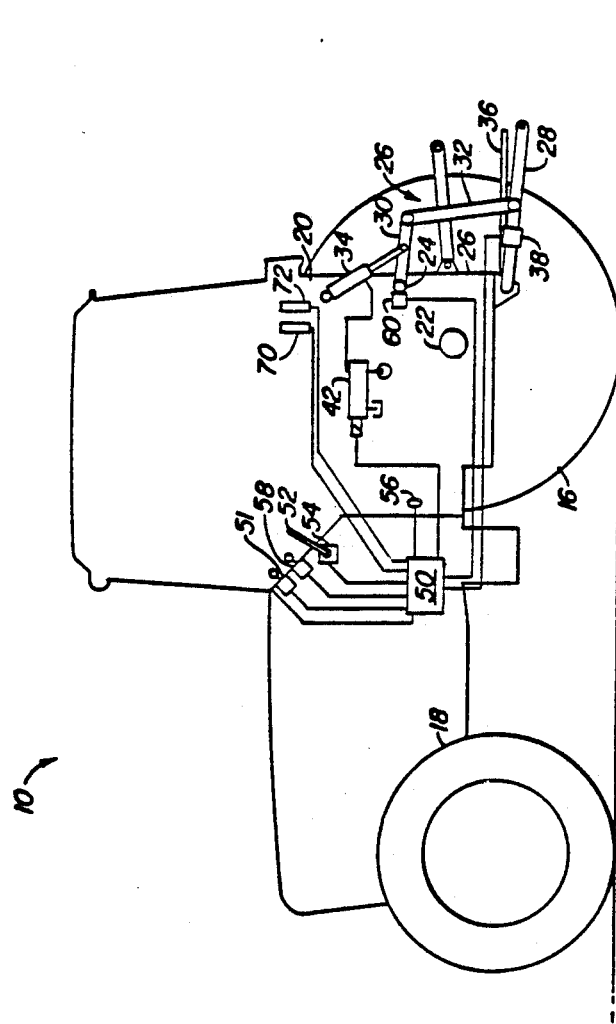
FIG. 1 is a simplified schematic of an agricultural tractor equipped with the present invention.
Figure 3A:
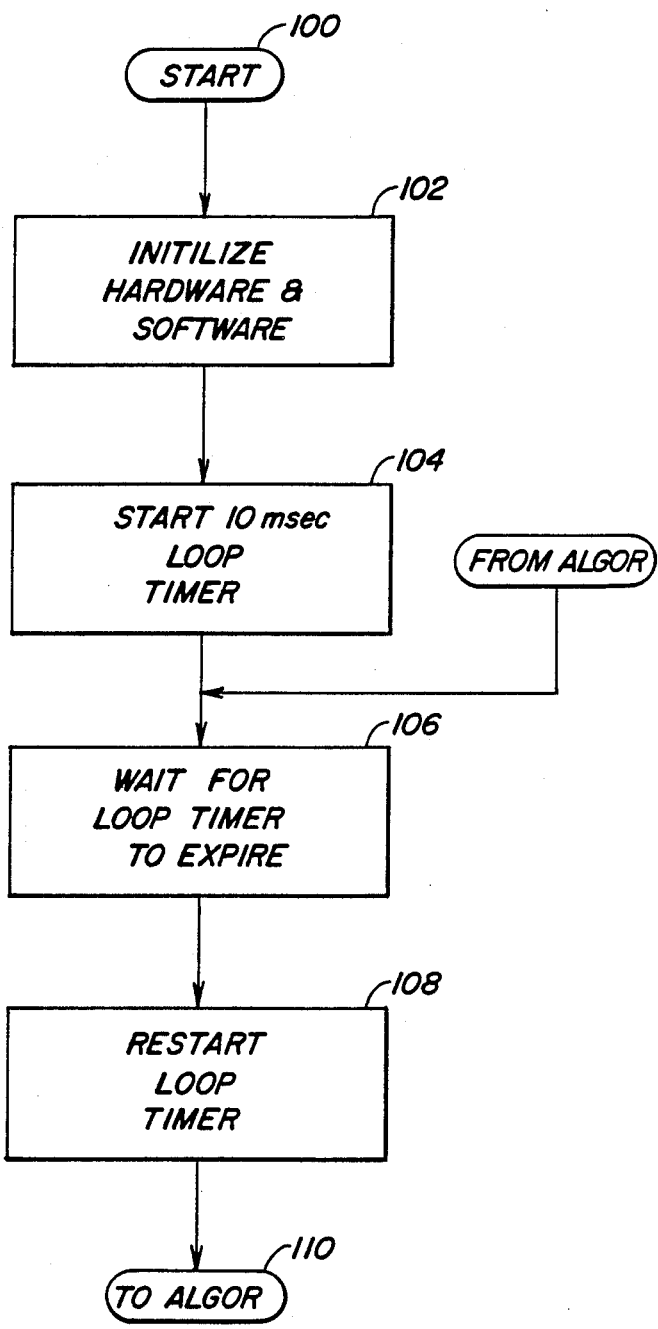
FIGS. 3a–3j are flow charts of the algorithm performed by the microprocessor of FIG. 2.
Figure 3B:
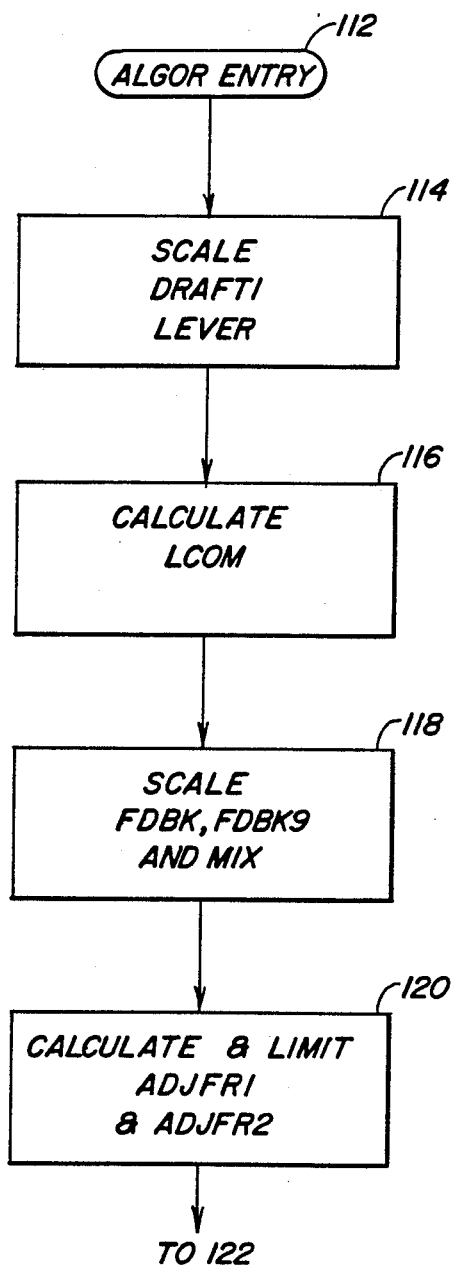
Figure 3C:
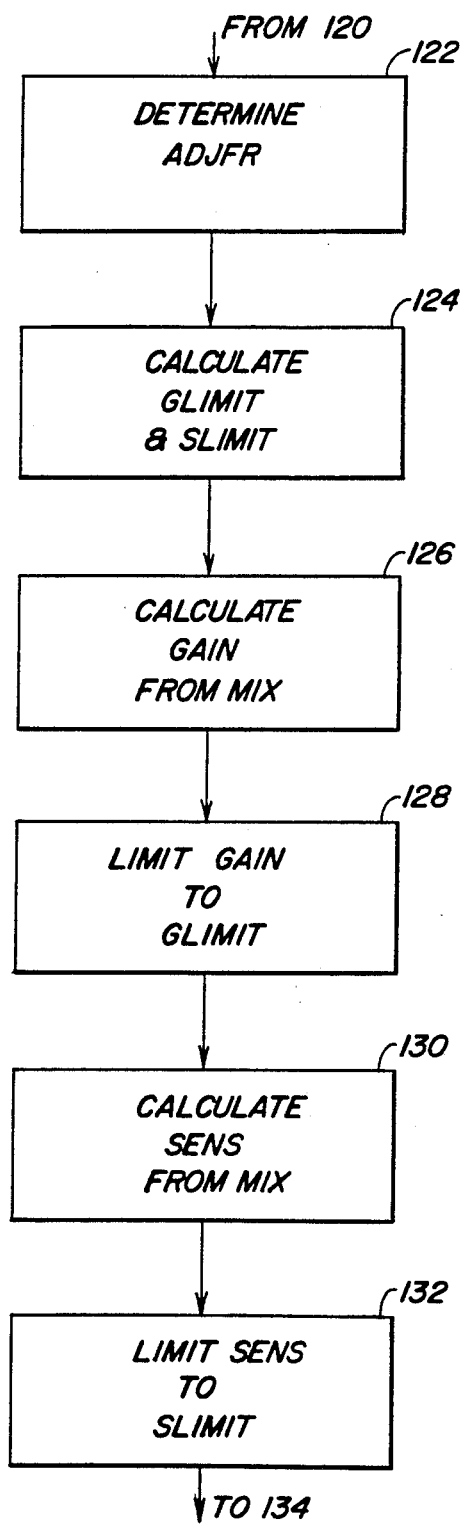
Figure 3D:
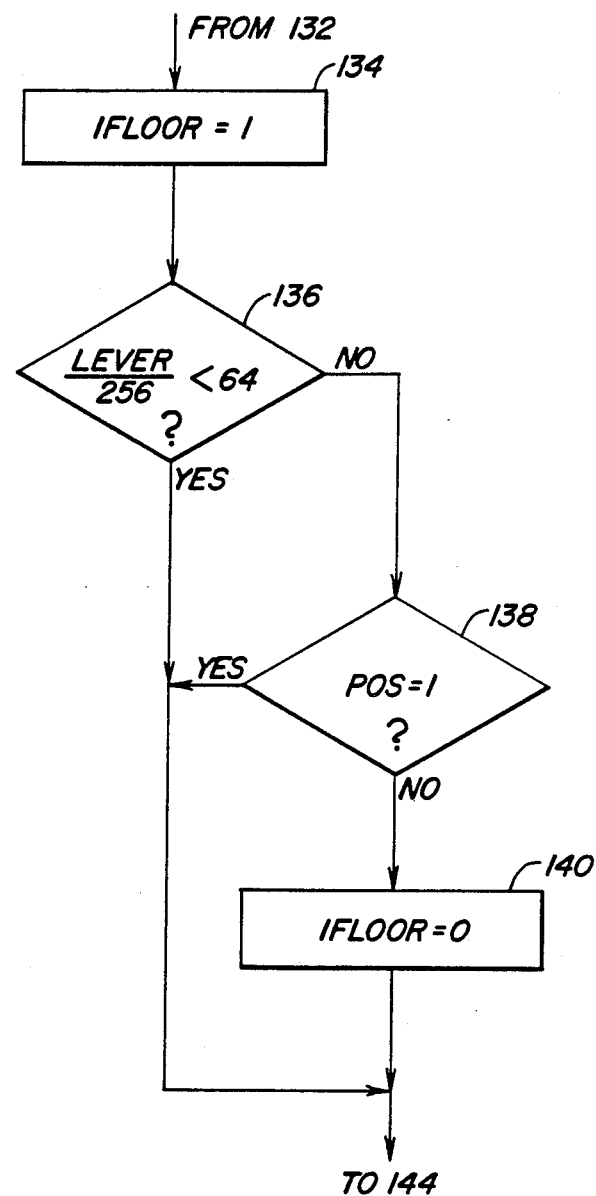
Figure 3E:
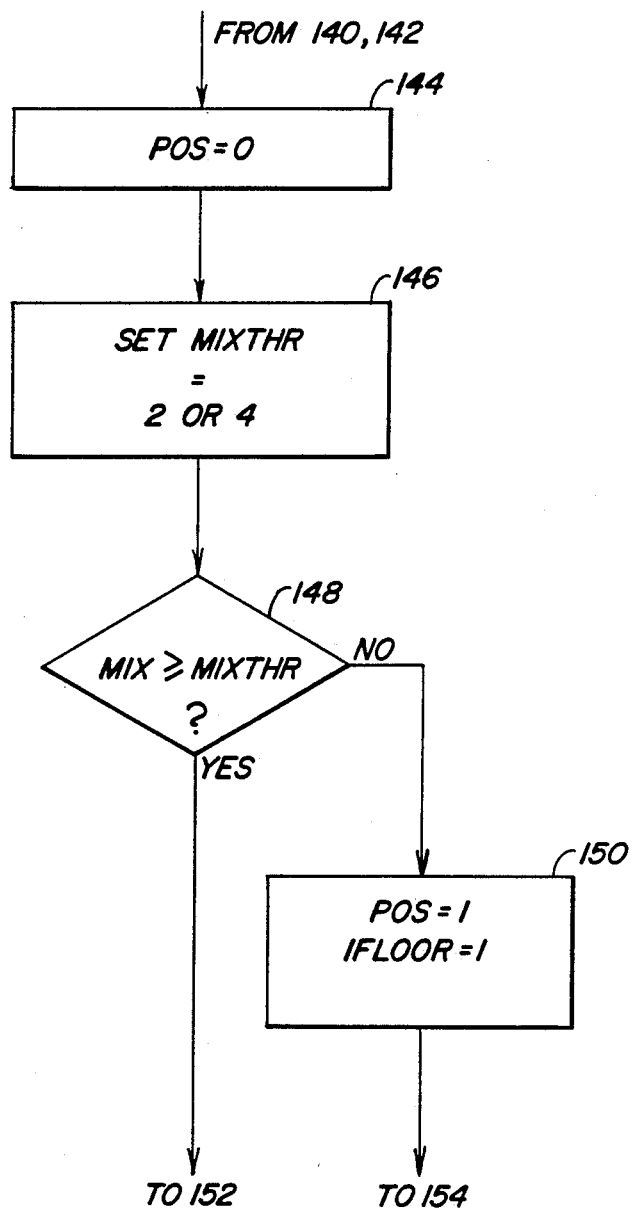
Figure 3F:
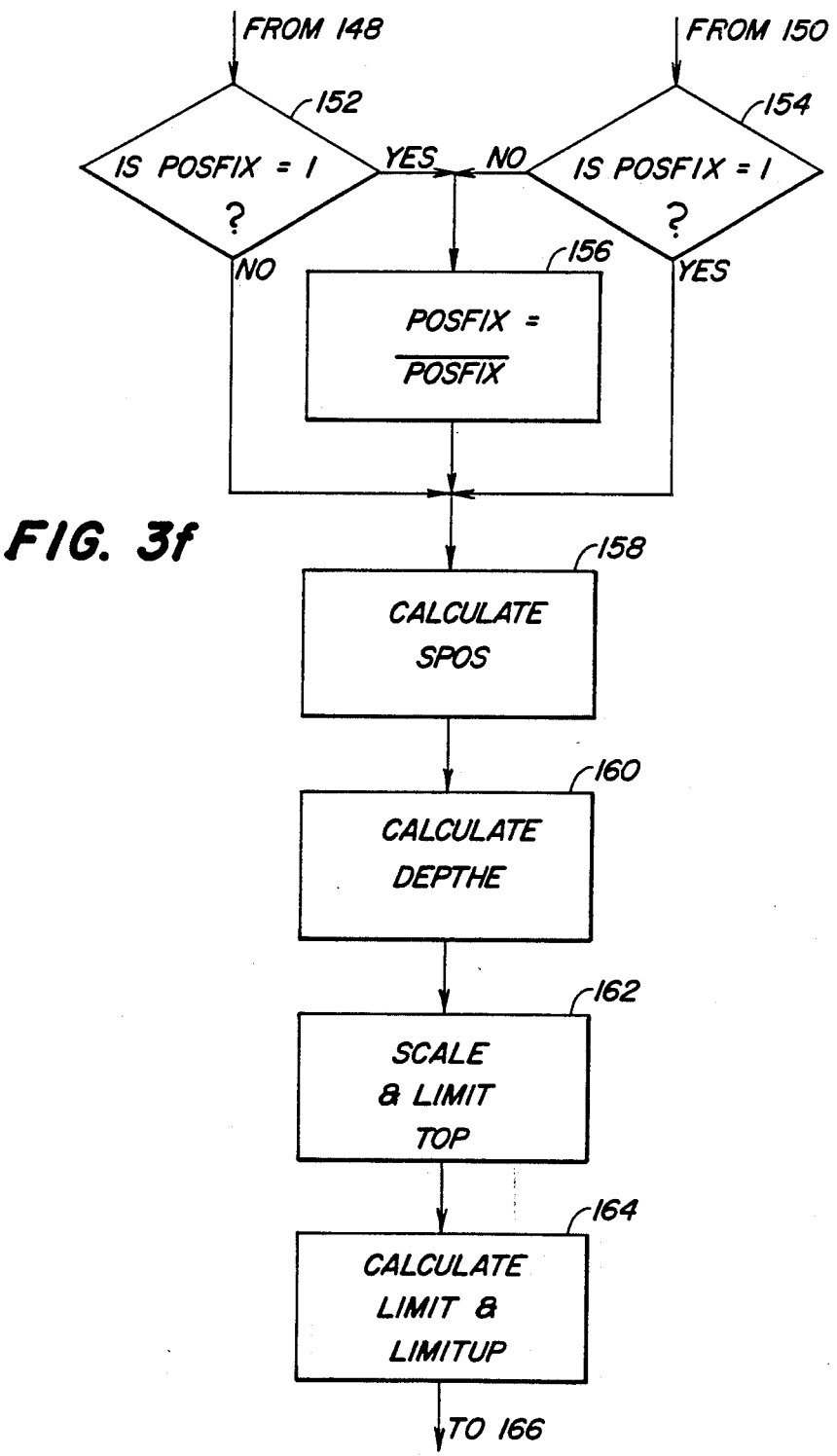
Figure 3G:
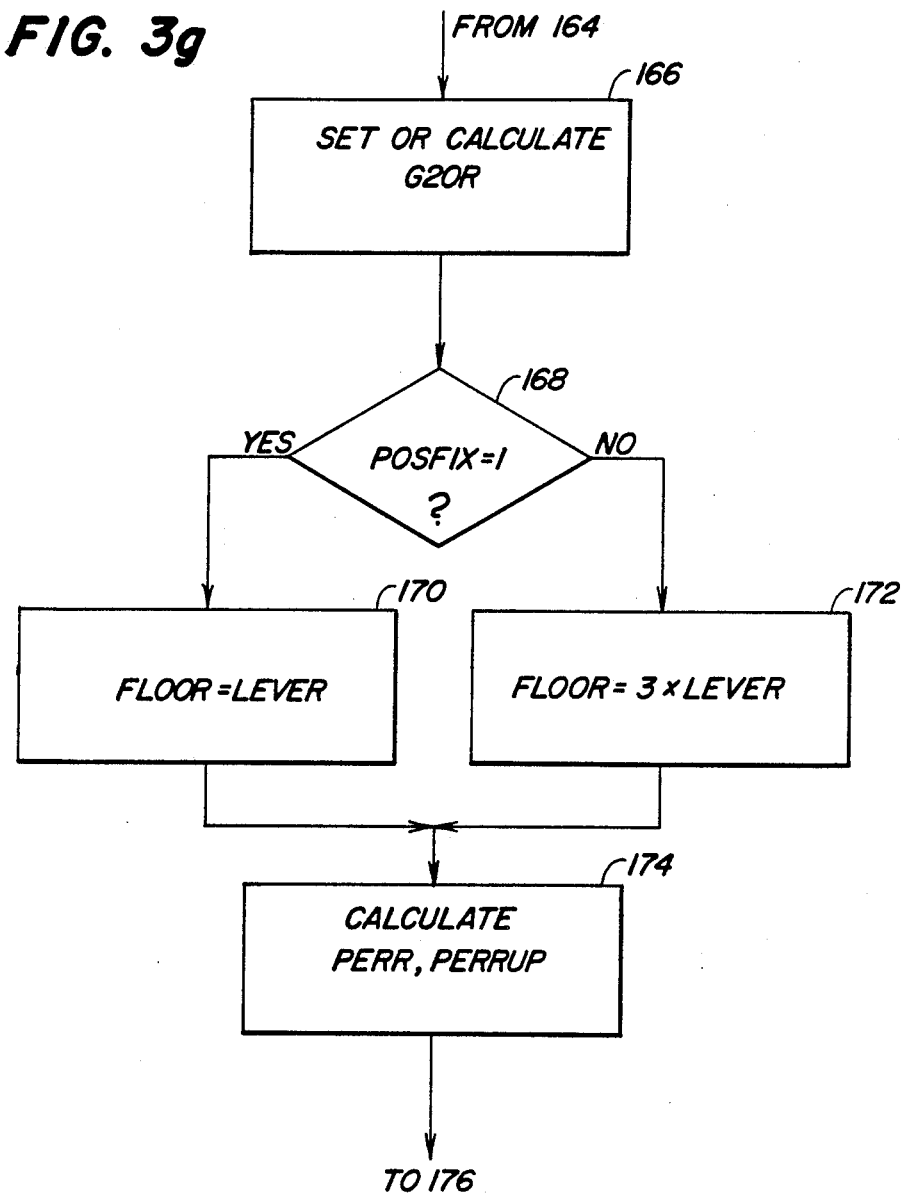
Figure 3H:
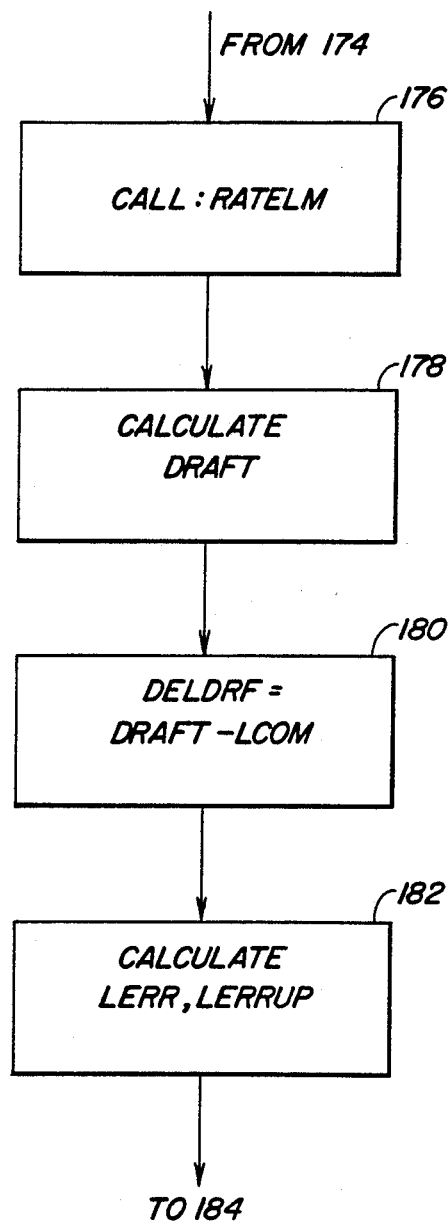
Figure 3I:
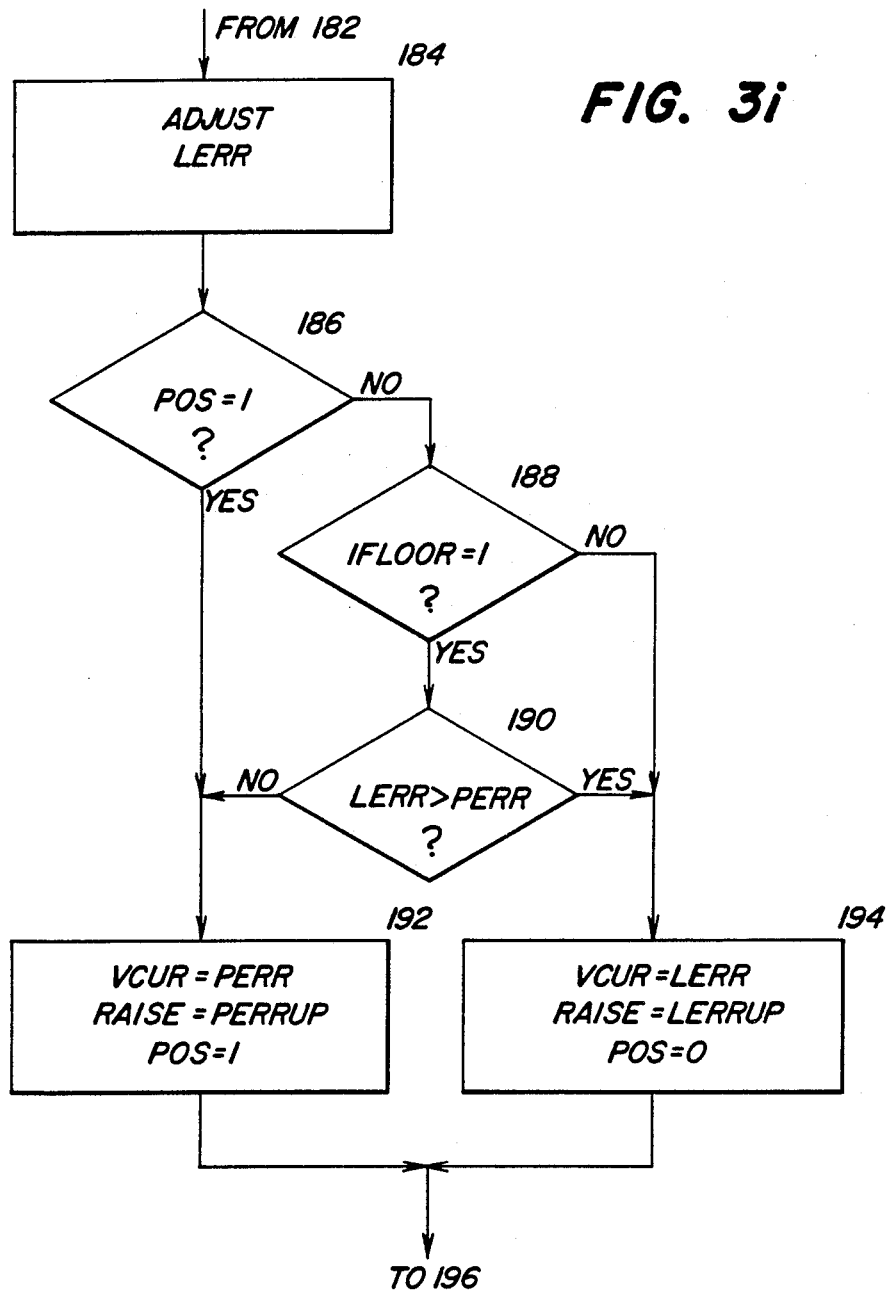
Figure 3J:
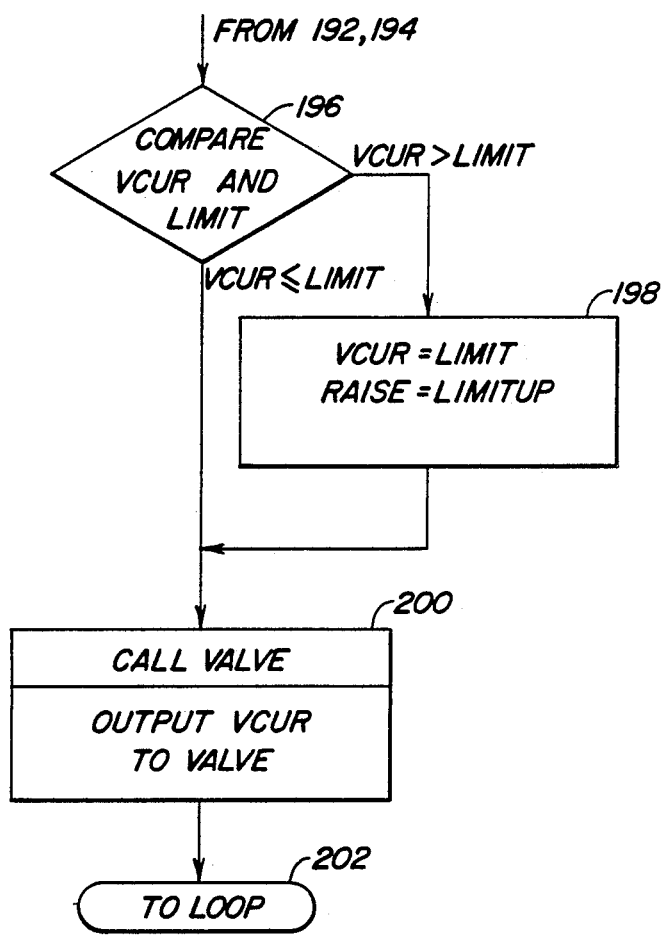
Figure 4:
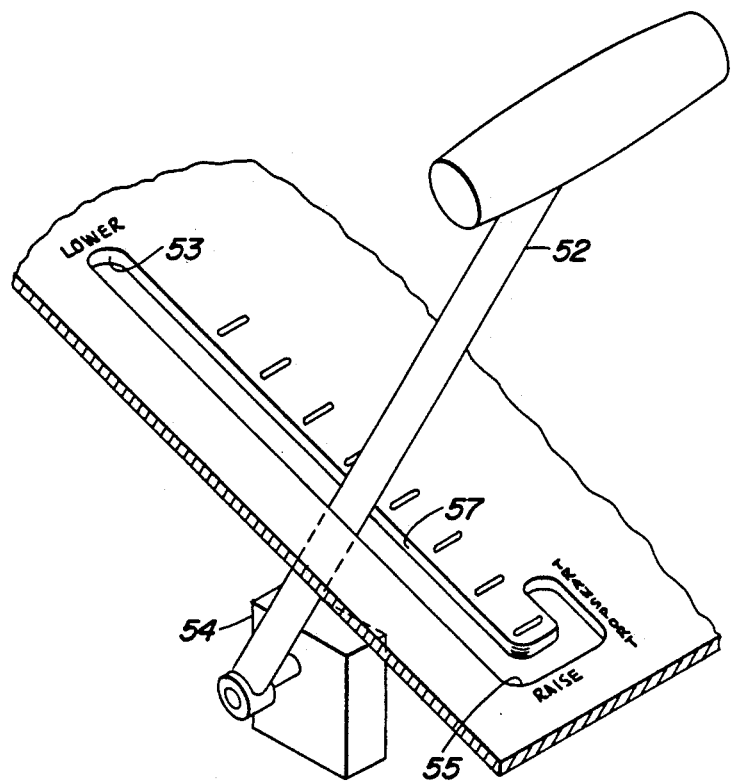
FIG. 4 is a view of the operator-controlled lever of FIG. 1.

A tractor 10 includes a rear housing 20 which supports a rear axle 22 and rockshaft 24. An implement hitch 26, such as a conventional 3-point hitch, includes draft links 28 which are connected to lift arms 30 via lift links 32. The lift arms 30 are connected to the rockshaft 24 to insure simultaneous and equal movement, and are raised and lowered via a pair of parallel connected hydraulic lift or rockshaft cylinders 34. A drawbar 36 extends rearwardly from the housing 20. The tractor 10 and the hitch 26 are merely exemplary and those skilled in the art will understand that the invention can be applied to tractors and hitches of other configurations. For example, this invention can be used on an articulated four-wheel drive tractor or on a front-wheel drive row-crop tractor.

An integral-type, ground-engaging implement (not shown), such as a moldboard plow or a chisel plow, may be attached in a conventional manner to the draft links 28. Alternatively, a towed implement (not shown) may be coupled to the drawbar 36. A draft sensor 38 is interposed in a strap (not shown) which is inserted in place of the hydraulic draft force sensing cylinder of the conventional hydromechanical hitch system to sense the draft force transmitted to the draft links 28 from the integral implement. Alternatively, separate left and right draft sensors could be inserted in the left and right draft links 28, and the signals therefrom electronically combined or averaged. In the case of a towed implement, the draft force may be sensed with a draft sensor interposed in the drawbar 36, or with a T-bar coupled to the draft links. In either case, any suitable known draft sensor would suffice, such as the Model GZ-10 manufactured by Revere Corporation of America.

The communication of hydraulic fluid to and from the cylinder 34 or to and from a remote cylinder (not shown) on a towed or semi-integral implement is controlled by a pair of solenoid-operated electrohydraulic flow control valves 42a and 42b which receive electrical control signals generated by a control unit 50. The flow control valves 42 could be such as described in U.S. Pat. Appln. Ser. No. 145,345, filed 19 January 1988 which is incorporated by reference herein or other commercially available valves.

An operator-controlled command lever 52 is coupled to a lever transducer 54 (such as a potentiometer) which generates a command signal which represents a desired hitch position or a desired draft load, or a combination thereof, depending upon the setting of a load/depth or mix control potentiometer 56. An electrical upper position limit signal is provided by an operator-adjustable potentiometer 51. The lever 52 moves within a slot 57. The ends 53 and 55 of this slot act as lower and upper mechanical stops, respectively, which mechanically limit the position of control lever 52, and thus limit the signal from potentiometer 54. Also provided is an operator-adjustable drop rate potentiometer 58.

A position transducer 60, such as a conventional rotary potentiometer, generates a sensed position signal which represents the actual sensed position of the rockshaft. A position feedback signal could also be obtained from the lift cylinder 34 or from a remote lift cylinder if that cylinder includes a position transducer, such as described in U.S. Pat. No. 3,726,191, for example.

Also, a double pole, double throw raise/lower switch 70 may be mounted outside of the tractor cab near the hitch 26 so that an operator can raise and lower the hitch from outside of the tractor cab. A calibration switch 72 is mounted inside the tractor cab, but is not part of the present invention.

Referring now to FIG. 2, the control unit 50 includes an analog-to-digital converter 502, a latch 504, an electrically erasable, programmable read only memory (EEPROM) 506, a microprocessor 508 with an integral timer (not shown) and a pair of valve drivers 512. The valve drivers could be any conventional pulse-width modulated valve current driver, but preferably are such as described in copending U.S. Pat. application, Ser. No. 294,527, filed 1/6/89. The analog signals from sensors/potentiometers 38, 51, 54, 56, 58 and 60 are coupled to the microprocessor 508 via analog-to-digital converter 502. Latch 504 couples raise/lower switch 70 and calibration switch 72 to microprocessor 508. EEPROM 506 stores calibration data used in a calibration method which forms no part of this invention.

The control algorithm which is executed by the control unit 50 is by the flow chart shown in FIGS. 3a–3j. For more details concerning the algorithm, the reader is referred to the computer program listing contained in the microfiche appendix. In the following description, "G.T." represents "greater than", "L.T." represents "less than", "G.T.E." represents "greater than or equal to", and "L.T.E." represents "less than or equal to".

The algorithm starts at step 100, after which, in step 102, various variables and hardware are initialized. Then, steps 104–110 operate to cause execution of the ALGOR algorithm once every 10 miliseconds. The ALGOR algorithm is entered at step 112, then in step 114 the values representing draft force sensed by sensor 38 (DRAFT) and the signal from potentiometer 54 representing the position of lever 52 (LEVER) are appropriately scaled. In step 116, a load command value, LCOM, is calculated from the equation: LCOM=(LEVER×1693/65536)+83. Then, in step 118, the following values are scaled: FDBK (16-bit value representing rockshaft position from potentiometer 60), FDBK9 (9-bit value representing rockshaft position) and MIX (value representing the setting of mix control potentiometer 56).

In step 120, the following equations and statements are used to calculate and limit sensitivity and gain limit values (ADJFR1) and (ADJFR2):
ADJR1=(FDBK/256−G71F(×G70f,
If ADJFR1L.T. 0, then AJDFR1=0,
If ADJFR1 G.T. 255, then ADJFR1=255,
ADJFR2=(LEVER/256- G71L)×G70L,
If ADJFR2L.T. 0, then ADJFR2=0,
If ADJFR2 G.T. 255, then ADJFR2=255, where G71F, G70f, G71L and G70L are predetermined constants.

Then, in step 122, a value ADJFR is set equal to the larger of ADJFR1 or ADJFR2. The ADJFR value is then used in step 124 to determine a gain limit (GLIMIT) and a sensitivity limit (SLIMIT) from the following equations and statements:
GLIMIT=(ADJFR×G72/256)+G60,
SLIMIT=ADJFR+128, and
If SLIMIT G.T. 255, then SLIMIT=255, where G60 and G72 are predetermined constants.

In step 126, a gain value, GAIN, is determined as a function of the value MIX which represents the operator setting of the mix control 56 as follows:
If MIX L.T. G63, then GAIN=G60,
If G63 L.T. MIX L.T. G64, then GAIN=(MIX-G63)×G61+G60, or G61, G63 and G64 are predetermined constants.

In step 130, the sensitivity value, SENS is determined as a function of MIX as follows:
If MIX L.T. G63, then SENS=128- (G63-MIX)×G66/256,
If G63L.T. MIX L.T. G64, then SENS=128,
If MIX G.T. G64, then SENS=(MIX - G64)×1.5+128,
If SENS L.T. G62, then SENS=G62, and
If SENS G.T. 255, then SENS=255, where G62 and G66 are predetermined constants. As a result of steps 126 and 130, when the mix control 56 is adjusted from minimum to maximum, the sensitivity will first increase, then the gain will increase, then the sensitivity will increase again.

Step 132 limits the SENS value to the SLIMIT value set in step 124. Then, step 134 sets a flag value (IFLOOR) equal to 1 which represents the initial assumption that the control system is a mode wherein it is desired for there to be a minimum or "floor" position below which the hitch will not be lowered.

Then, in step 128, the GAIN value is limited to the GLIMIT value, with the result that steps 120–132 operate to limit system gain and sensitivity so that incidental hitch vibration does not self-activate the control system when the hitch is raised and holding itself or an implement out of the ground.

Step 136 then determines if the lever 52 is in the rear one-fourth of its position range. A LEVER value of zero represents lever 52 full back (rear) and a LEVER value of 6535 represents lever 52 full forward. If the lever 52 is in the rear one-fourth of its allowed range, then step 136 directs the algorithm to step 144; otherwise, the algorithm proceeds to step 138 which examines the value of a position mode flag, POS. If POS=1, then the system is currently in its position control mode and step 138 directs the algorithm to step 144. If POS=0, indicating the system is in its draft control mode as a result of the earlier operation of step 194, then step 138 directs the algorithm to step 140 where the flag value IFLOOR is set equal to zero, indicating that the minimum or "floor" hitch position feature is not required.

In step 144, the POS flag is set equal to zero, indicating the assumption that the system is in its draft force control mode (step 194) until POS is set equal to 1 through operation of step 192 or 150.

In step 146, a MIXTHR value is set equal to 2 or 4, depending upon the value of POSFIX flag which is randomly initialized to 1 or 0 upon system start-up, and which is complimented at step 156. Then, if in step 148, MIX is greater than MIXTHR, this means that the control system is not in a "fixed position" control mode and the algorithm proceeds to step 152. If MIX is not greater than MIXTHR, it means that the system is in a "fixed position" control mode and the algorithm proceeds to step 150 where the POS flag is set equal to 1 and the IFLOOR flag is set equal to 1, and then to step 154.

Steps 152 and 154 both operate to determine if the POSFIX flag properly represents the setting of the mix pot 56. Step 152 directs the algorithm to step 156 if the POSFIX flag has been set, else to step 158. Step 154 directs the algorithm to step 156 if the POSFIX flag is set, else to step 158. Step 156 compliments the POSFIX flag value. Thus, steps 146–156 operate with a "hysteresis" which operates so that the control system ignores random low level noise generated by the mix potentiometer 56.

In step 158, a position set point value, SPOS, is determined as follows:
SPOS=(LEVER×178/65536)+243.
Thus, the SPOS value depends on the position of control lever 52, but is permitted values that correspond to only the lower portion (preferably approximately one-half) of the range of positions which can be occupied by the hitch 26.

In step 160, a depth error value, DEPTHE, is determined by the equation:

DEPTHE=FDBK9−SPOS.

This DEPTHE value is an implement depth error value and is utilized in later step 182 to determine a load error value, LERR.

Next, in step 162, an upper hitch limit position value, TOP, is obtained by scaling and limiting the TOPLIM value obtained from operator-controlled upper limit potentiometer 51 according to the following relationship:
TOP=146−146×TOPLIM/256, and
If TOP L.T. 15, then TOP=15.

In step 164, a valve command limit value, LIMIT, is determined from the following relationships:
If FDBK G.T. TOP×256, then G20=G20PS, else
If G20R=0, then G20=G20PS×2, else G20=G20R, where G20PS is a current limit value for the pressure valve, G20R is a current limit value for the return valve.

If ABS(FDBK - (TOP×256)) G.T. 16384, then LIMIT =G20, and
If ABS(FDBK - (TOP×256)) L.T.E. 16384, then LIMIT=G20−G20×(1- (ABS(FDBK - (TOP×256))/16384)$^2$, where ABS represents the absolute value function, and where G20 is a predetermined constant.

Also, in step 164, a valve limit direction flag value is set according to the relationship:
If FDBK L.T. TOP, then LIMTUP=0, else LIMTUP =1, where LIMTUP=0 indicates that the command limit is a minimum return valve command and where LIMTUP=1 indicates that the command limit is maximum pressure valve command.

This valve command limit, LIMIT, represents the maximum magnitude or strength of any command which would command the pressure valve 42a or a minimum which would command the return valve 42b to either open or close. It should be noted that as the hitch 26 nears the operator determined upper position limit (TOP) set by the upper limit potentiometer 51, the LIMIT value is determined as a non-linear function of the absolute value of the difference between FDBK (sensed hitch position) and TOP. More precisely, the LIMIT value is related to the square of the the quantity: (1- (ABS(FDBK−(TOP×256))/16384)).

This non-linear relationship causes the hitch to move gradually and smoothly to its upper position when commanded to do so as a result of the operator pulling back the lever 52, even when the hitch and implement are raised above the ground.

In step 166, a return valve current limit value, G20R, is derived from a drop rate value, DRATE, (which is determined by the setting of the operator-controlled drop rate potentiometer 58) according to the following relationship:
If DRATE G.T. 255, then G20R=0, else G20R=2×G20PS×(DRATE/256)+G20RM,
where G20PS and G20RM are predetermined constants which are set to adjust the maximum valve current to the requirements of the particular electrohydraulic valve.

This allows an operator to control the maximum degree to which return valve 42b can be opened, thus controlling the maximum rate at which the hitch 26 will be lowered. Thus, the return valve limit value, G20R, is essentially (to the extent possible with 8-bit digital control) infinitely variable by the operator within a certain range.

Step 168 determines whether or not the POSFIX flag is equal to 1, indicating that a "fixed position" mode is operative. Steps 152-156 operate to determine the appropriate value of POSFIX, with the result that POSFIX will equal 1 only when the mix potentiometer 56 is set at its minimum (pure position) setting. If POSFIX=1, then the algorithm proceeds to step 170, where a reference value FLOOR is set equal to the LEVER value; otherwise the algorithm proceeds to step 172 where the reference value FLOOR is set equal to a multiple (three times) of the LEVER value.

Next, in step 174, a position control mode valve command, PERR, is determined as a non-linear function of the quantity (FDBK−FLOOR) as follows:
If FDBK G.T.E. FLOOR, then G20=G20PS, else
If G20R=0, then G20=G20PS×2, else G20=G20R.
If ABS(FDBK−FLOOR) G.T. 16384, then PERR=G20, If ABS(FDBK−FLOOR) L.T.E. 16384, then PERR=G20−G20×(1−ABS(FDBK−FLOOR)/16384)$^2$, and If FDBK L.T. FLOOR, then PERRUP=0, R5,=FDBK−FLOOR, else, PERRUP=1 and R5 =0, where PERRUP is a flag (0 indicating signal to be applied to the return valve 42b, 1 indicating signal to be applied to pressure valve 42a), and where R5 is a value which is utilized elsewhere in the algorithm. From this non-linear function for PERR, it follows that the first derivative of PERR with respect to the difference or error quantity (FDBK-FLOOR) is equal to zero when (FKBK-FLOOR) is equal to 16384; where 16384 is a limit value for the difference (FKBK-FLOOR) corresponding to a maximum desired or permitted PERR value. The result is a control system wherein the gain is modified to eliminate jerky movement of the hitch as the position error varies near a value corresponding to the maximum value current represented by the G20 value. Thus, step 174 includes a non-linear position error function which, similar to the function in step 164, operates to cause the hitch to move smoothly and gradually to lever positions (represented by FLOOR) commanded by the operator moving the lever 52 forward, even when the hitch and implement are raised above the ground. Steps 168 and 172 operate when the system is responsive to sensed draft force (as a result of the setting of mix pot 56) to prevent the FLOOR value from interferring with draft force induced lowering of the hitch. Thus, steps 164 and 174 operate so that the hitch is position-limited as a non-linear function of sensed position (FDBK) between the desired upper limit hitch position and the desired lower limit hitch position commanded by the operator via lever 52.

Figure 5A:
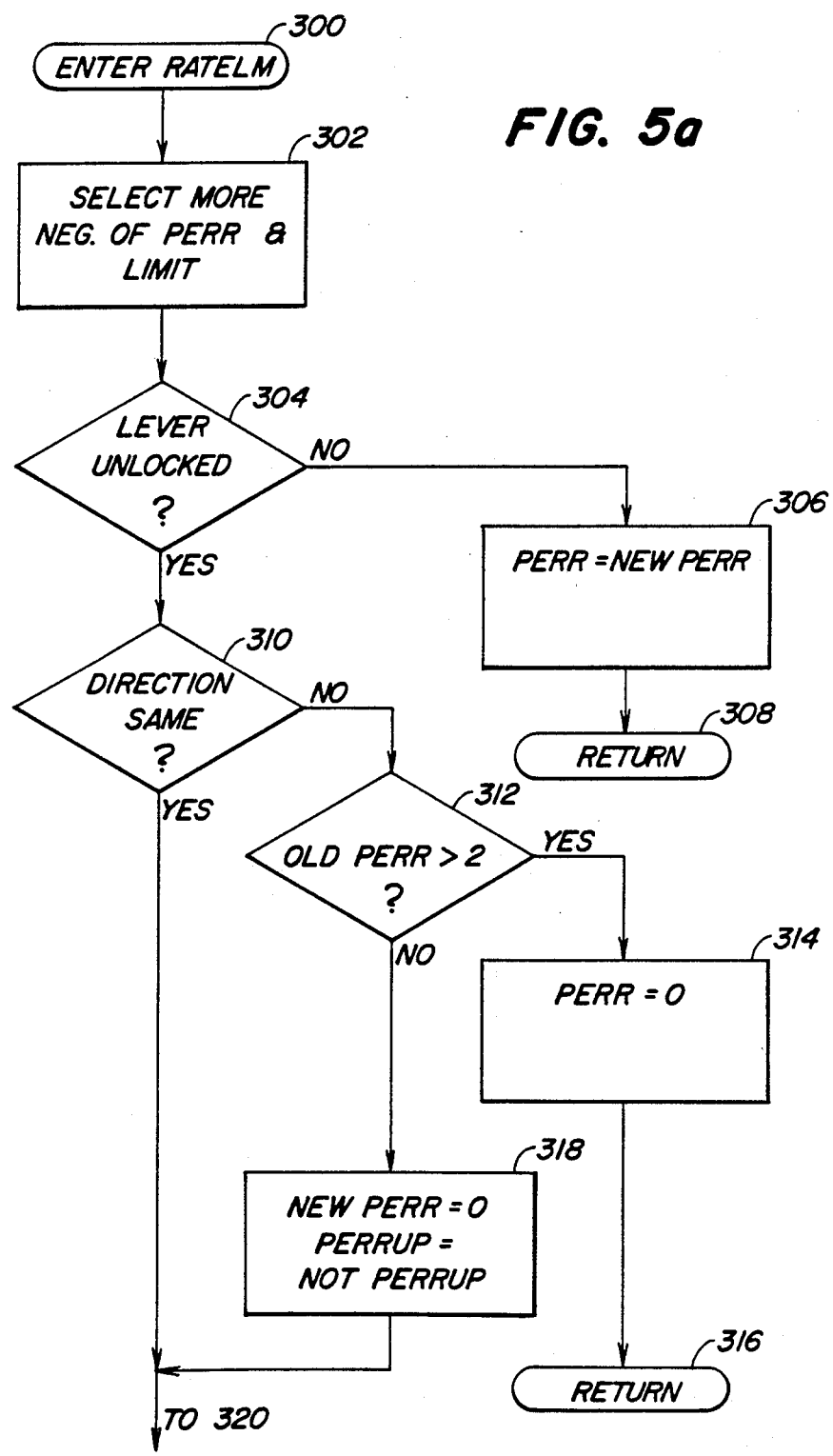
FIGS. 5a–5c are flow charts of a subroutine which is performed by the microprocessor of FIG. 2.
Figure 5B:
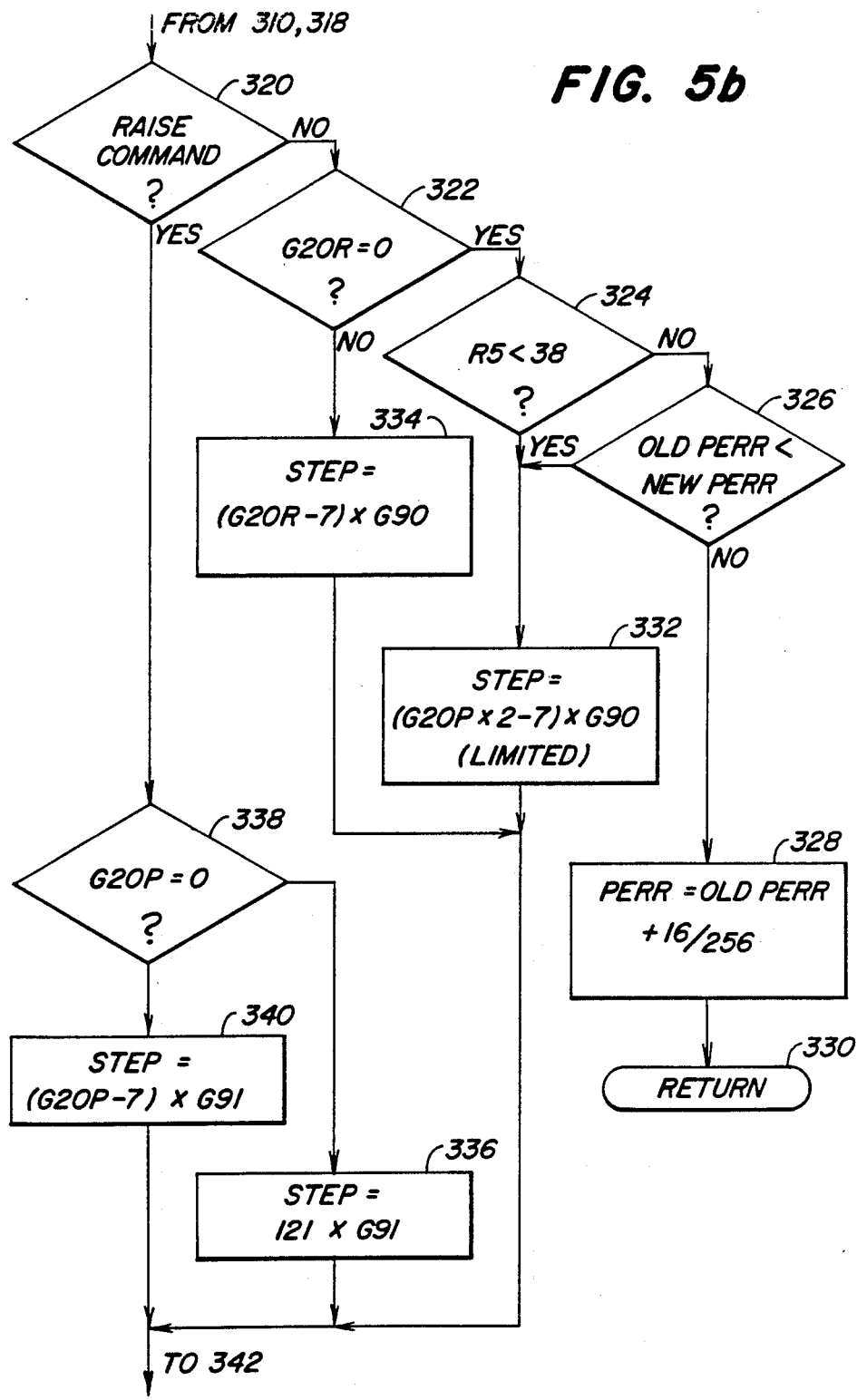
Figure 5C:
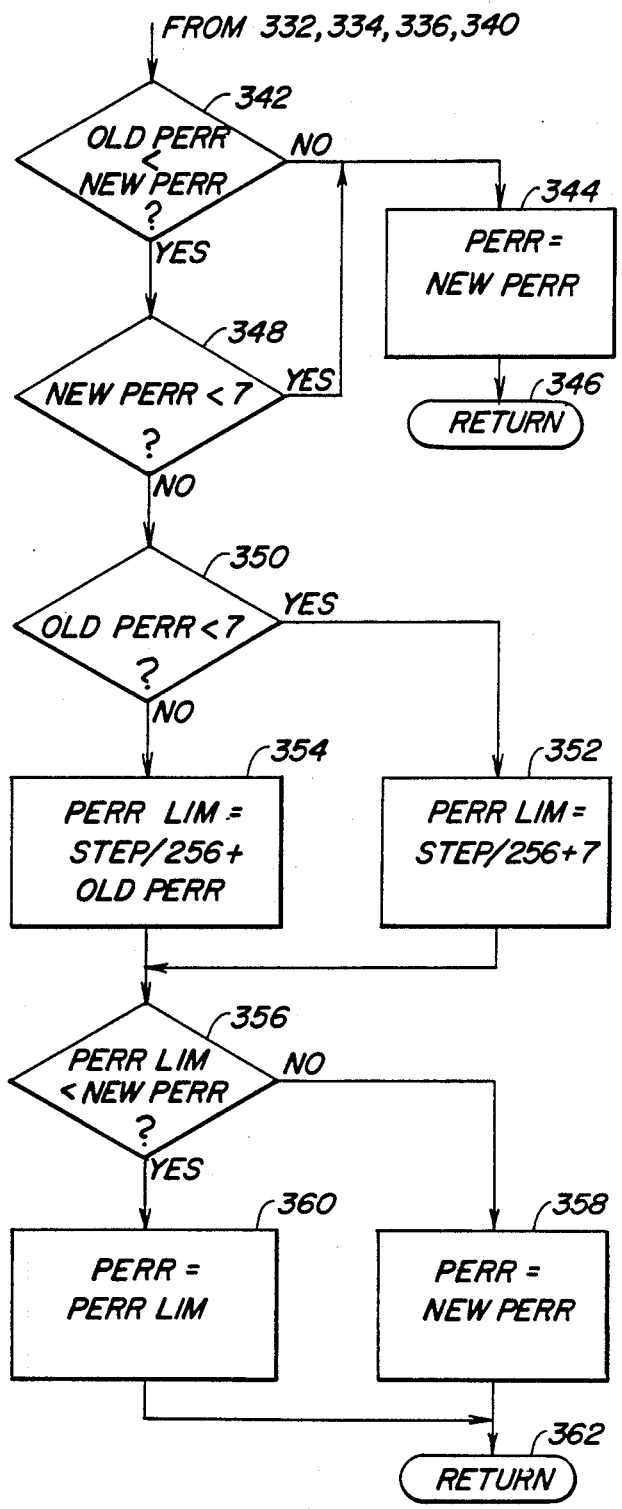

Step 176 calls a subroutine, RATELM, which utilizes the R5 value determined in step 174 and which operates to limit the rate at which valves are opened in response to increasing position error values. As shown in FIGS. 5-a5c, the RATELM subroutine executes steps 300-362 and sets the position error value PERR equal to the more negative of PERR or LIMIT. The RATELM subroutine is fully set forth in the computer program listing contained in the microfiche appendix.

In step 178, an internal sensed draft force value, DRAFT, is calculated as a function of the signal from the draft sensor 38, or if multiple draft sensors are used, as a function of the average of the signals therefrom.

In step 180, a draft error value, DELDRF is set equal to the difference between, DRAFT and the load command value, LCOM Then, in step 182, a "combined" or load error value, LDERR, is derived from the draft error (DELDRF), the sensitivity (SENS), the depth error (DEPTHE) and the gain value (GAIN) according to the following:
LDERR=(DELDRF×SENS/256+DEPTHE)×GAIN, If LDERR L.T. 0, LERRUP=0, else LERRUP=1, and LERR=ABS(LDERR) (limited to 32767), where LERRUP is a flag value (0 indicating signal to be applied to return valve 42b, 1 indicating signal to be applied to pressure valve 42a). Thus, when the operator has selected a mix setting via potentiometer 56 which causes the system to respond to changes in sensed draft force, steps 178–182 operate to derive the draft force or load error value, LERR as a mixture primarily as a linear function of the sensed draft force and secondarily as a linear function of the limited position error value, DEPTHE. This linear function allows the control system to rapidly respond to changes in draft force, whereas the non-linear functions in steps 164 and 174 allow the system to smoothly control the hitch when the hitch is being controlled as a function of the sensed hitch position.

Because the SPOS value can only be equivalent to positions of the hitch 26 in the lower one-half of its range, the DEPTHE value in step 182 will tend to cause the control system to keep the hitch in the lower range of its positions and thus tend to keep the implement in the ground. This also has the effect that when the system is operating in the draft force control mode in a steady state, equilibrium condition, changes in the setting of the mix potentiometer 56 will cause only minimal changes in the operating depth of the implement. It should also be noted that the sensitivity value, SENS, determines the relative influence of draft force error and depth error on the determination of the load error, LERR. As a result of step 130, the magnitude of this relative influence is limited to a range of approximately 0.5 to 2.0.

In step 184, if LERR is non-zero, then LERR is set therein to different values depending upon whether the necessary control signal is to be applied to return valve 42b or to the pressure valve 42b, according to the following:

If LERRUP=1, then LERR=16×LERR×G18LP/65536+G19ADD, and

If LERRUP=0, then LERR=16×LERR×G18LR/65536+G19ADD, where G18LP, G18LR and G19ADD are predetermined constants. In this manner, a different magnitude LERR value will be used for the return valve 42b. than for the pressure valve. This provides a tailoring of the algorithm to different flow characteristics of the pressure and return valves.

In step 186, the POS flag is examined to determine whether a pure position control mode is operative. If so, the algorithm proceeds to step 192 wherein the valve command or valve current VCUR is set equal to the position error value PERR, a RAISE flag is set equal to PERRUP and the POS flag is set equal to 1. Otherwise, the algorithm proceeds to step 188.

Step 188 determines whether the IFLOOR flag has been set equal to 1 to indicate that a position floor is required. If not, the algorithm proceeds to step 194 which sets the VCUR value equal to the combined or load error value, LERR, sets the RAISE flag equal to LERRUP and the POS flag equal to 0, otherwise the algorithm proceeds to step 190.

Step 190 directs the algorithm to step 194 if LERR is greater than PERR; otherwise, to step 192. From steps 192 and 194, the algorithm proceeds to steps 196 and 198 which limit the VCUR value to the limit value, LIMIT, and then to step 200 which outputs the VCUR value to the appropriate valve driver 512 or 514 to cause the cylinder 34 to extend or retract. Finally, step 202 causes a return to the timing loop shown in FIG. 3a.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. In a vehicle having a hitch for attaching a ground-penetrating implement thereto and actuating means for raising and lowering the hitch through a range of positions in response to control signals applied to an input thereof, a control system comprising:
   means for determining a draft error value (DELDRF) representing a difference between a sensed draft force value and an operator controlled reference draft force value;
   means for determining a position error value (DEPTHE) representing a difference between a sensed hitch position value and a reference hitch position value; and
   means for deriving said control signals (LDERR) from the draft error (DELDRF), position error (DEPTHE), and from a sensitivity value (S) and a gain value (G) according to the following relationship:

$$LDERR = G \times ((DELDRF \times S) + DEPTHE),$$

wherein G and S are operator controlled values; and
   means for limiting the magnitude of S from approximately 0.5 to 2.0.

2. The invention of claim 1, further comprising:
   means for limiting the gain and sensitivity values as a function of the sensed hitch position value.

3. The control system of claim 1, further comprising:
   an operator controlled device for generating a mix value;
   means for generating the gain value as a function of the mix value; and
   means for generating the sensitivity value as a function of the mix value.

4. The control system of claim 3, wherein:
   the gain value and sensitivity value generating means operate so that adjusting the mix value to increase the sensitivity value causes the gain value generating means to increase the gain value.

5. In a vehicle having a hitch for attaching a ground-penetrating implement thereto and actuating means for raising and lowering the hitch through a range of positions in response to control signals applied to an input thereof, a control system comprising:
   a sensor for generating a feedback signal (FDBK) representing a sensed position of the hitch;
   means for generating a reference signal (R) representing a reference position of the hitch;
   means for generating an error signal representing a non-linear function of a difference between the feedback and reference signals, said function being such that a gain of the control system is modified for a value of said difference which corresponds to a maximum value of the control signal applied to the input of the actuating means so as to reduce jerkiness of hitch movement when said difference changes from said corresponding value; and
   means for converting the error signal to the control signal.

6. The control system of claim 5 further comprising:
   means for setting the error signal equal to a limit signal if the limit signal is less than the error signal;
   operator-controlled means for generating a top position signal representing a desired upper limit position for the hitch; and
   means for generating the limit signal as a nonlinear function of a difference between the feedback signal and the top position signal.

7. The control system of claim 5, further comprising:
   a draft force sensor for generating a draft force signal representing sensed draft force produced by implement-ground interaction; and
   means for generating the control signals as a linear function of the draft force signal.

8. In a vehicle having a hitch for attaching a ground-penetrating implement thereto and actuating means for raising and lowering the hitch through a range of positions in response to control signals applied to an input thereof, a central system comprising:
   a position sensor for generating a position signal representing a sensed position of the hitch;
   an operator-movable command device for setting a desired valued of a command signal;
   a draft force sensor for generating a draft force signal representing sensed draft force produced by implement-ground interaction;
   an operator-controlled mix setting device for generating a mix value which represents desired levels of influence of the position and draft force signals upon the central system;
   means for generating control signals as a function of the draft force signal and the mix value;
   means for setting a reference signal equal to the command signal when the mix setting device is in a first condition and for setting the reference signal equal to a multiple of the command signal when the mix setting device is in a second condition; and
   means for generating control signals as a function of a difference between the sensed position signal and the reference signal.

9. The control system of claim 8, wherein:
   the reference signal is set equal to a value corresponding to the position of the command device when the mix value represents maximum influence of the position signal; and
   the reference signal is set equal to a value corresponding to the position of the command device multiplied by a multiplication factor when the mix value does not represent maximum influence of the position signal.

10. The control system of claim 9, wherein:
    the multiplication factor is greater than 1.

11. In a vehicle having a hitch for attaching a ground-penetrating implement thereto and actuating means for raising and lowering the hitch through a range of positions in response to control signals applied to an input thereof, a central system comprising:
    an operator settable command device;
    a draft sensor for generating a draft value representing draft force produced by implement-ground interaction;
    a position sensor for generating a position value representing sensed hitch position;
    an operator-controlled mix setting device;
    means for generating a reference position value with a magnitude which is permitted to represent a predetermined range of settings of the command device;
    means for generating a reference draft value representing a setting of the command device;
    means for generating a draft error value representing a difference between the sensed and reference draft values;
    means for generating a position error value representing a difference between the sensed and reference position values;

means for generating a mix value and a gain value as a function of the setting of mix setting device, the mix value representing relative influence of draft error and position error, and the gain value representing linear system response to both draft and position error, and said means for generating the mix and gain values automatically increasing the gain value as the mix value is adjusted to increase the relative influence of draft error; and means for generating the control signal as a function of the draft error, position error, mix and gain values;

12. The control system of claim 11, wherein:

the magnitude of the reference position value is allowed to correspond only to settings of the command device which would normally cause the control system to maintain the hitch in a lower portion of its position range.

13. In a vehicle having a hitch for attaching a ground-penetrating implement thereto and actuating means for raising and lowering the hitch through a range of positions in response to control signals applied to an input thereof, a control system comprising:

a position sensor for generating a position signal representing a sensed position of the hitch;

a draft force sensor for generating a draft force signal representing sensed draft force produced by implement-ground interaction;

an operator movable command device for setting a desired command value;

an operator movable mix control, separate from the command device, for adjusting relative influence of position and draft force in the control system;

first means for generating the control signals primarily as a function of the position signal and the command value;

second means for generating the control signals primarily as a function of the draft force signal and the command value; and selection means operable independently of the mix control setting for making the first means operational when the command device is in a first range of positions and for making the second means operational when the command device is in a second range of positions.

14. In a vehicle having a hitch for attaching a ground-penetrating implement thereto and actuating means for raising and lowering the hitch through a range of positions in response to control signals applied to an input thereof, a control system comprising:

a sensor for generating a feedback signal (FDBK) representing a sensed position of the hitch;

means for generating a reference signal (R) representing a reference position of the hitch;

means for generating an error signal representing a non-linear function of a difference between the feedback and reference signals, the error signal being determined by the equation:

$$E = G20 - G20(1 - ABS(FDBK - (R \times a)) \times b)^2,$$

wherein a, b and G20 are predetermined constants, and where ABS is the absolute value function; and means for converting the error signal to the control signal.

* * * * *

UNITED STATES PATENT AND TRADEMARK OFFICE
CERTIFICATE OF CORRECTION

PATENT NO. : 4,979,092

DATED : 18 December 1990

INVENTOR(S) : Mark A. Bergene et al.

It is certified that error appears in the above-identified patent and that said Letters Patent is hereby corrected as shown below:

In Col. 10, lines 3 and 4, delete "im-plementground" and insert -- implement-ground --.

In Col. 10, line 11, delete "central" and insert -- control --.

In Col. 10, lines 17 and 18, delete "im-plementground" and insert -- implement-ground --.

In Col. 10, line 22, delete "central" and insert -- control --.

In Col. 10, line 49, delete "central" and insert -- control --.

In Col. 11, line 12, delete ";" and insert -- . --.

In Col. 12, line 31, delete "wherein" and insert -- where --.

Signed and Sealed this

Eighth Day of September, 1992

Attest:

DOUGLAS B. COMER

*Attesting Officer*         *Acting Commissioner of Patents and Trademarks*